(12) United States Patent
Zettier et al.

(10) Patent No.: US 7,758,488 B2
(45) Date of Patent: Jul. 20, 2010

(54) METHOD OF OPERATING A SEPARATOR BY RECIRCULATING AN ENTRAINING LIQUID

(75) Inventors: Karl-Heinz Zettier, Oelde (DE); Arnold Uphus, Oelde (DE); Markus Hüllmann, Rheda-Wiedenbrück (DE)

(73) Assignee: West falia Separator AG, Oelde (DE)

( * ) Notice: Subject to any disclaimer, the term of this patent is extended or adjusted under 35 U.S.C. 154(b) by 755 days.

(21) Appl. No.: 11/631,379

(22) PCT Filed: May 14, 2005

(86) PCT No.: PCT/EP2005/005304
§ 371 (c)(1),
(2), (4) Date: Dec. 29, 2006

(87) PCT Pub. No.: WO2006/007894
PCT Pub. Date: Jan. 26, 2006

(65) Prior Publication Data
US 2008/0017595 A1    Jan. 24, 2008

(30) Foreign Application Priority Data
Jul. 21, 2004  (DE) .................. 10 2004 035 223

(51) Int. Cl.
*A23C 7/04* (2006.01)
(52) U.S. Cl. .............. 494/37; 494/1; 426/491
(58) Field of Classification Search ........ 494/1, 494/2, 10, 11, 23, 27, 37, 42; 426/231, 491, 426/586; 99/452, 456
See application file for complete search history.

(56) References Cited
U.S. PATENT DOCUMENTS

| 2,264,665 | A | * | 12/1941 | Hall ................... 426/417 |
|---|---|---|---|---|
| 2,423,834 | A | * | 7/1947 | Horneman et al. ...... 426/417 |
| 2,542,456 | A | * | 2/1951 | Ayres ................. 494/2 |
| 2,628,023 | A | * | 2/1953 | Dahlstedt ............. 494/2 |
| 2,837,271 | A | * | 6/1958 | Haglund .............. 494/10 |
| 3,379,370 | A | * | 4/1968 | Anderson ............. 494/11 |
| 3,656,685 | A | * | 4/1972 | Kjellgren ............. 494/42 |
| 3,829,584 | A | * | 8/1974 | Seiberling ........... 426/231 |
| 3,924,804 | A | * | 12/1975 | Niemeyer ............. 494/37 |
| 3,946,113 | A | * | 3/1976 | Seiberling ........... 426/231 |
| 3,983,257 | A | * | 9/1976 | Malmberg et al. ..... 426/231 |
| 4,017,643 | A | * | 4/1977 | Lester .............. 426/231 |
| 4,074,622 | A | * | 2/1978 | Niemeyer ............. 99/456 |
| 4,075,355 | A | * | 2/1978 | Pato ................ 426/231 |
| 4,689,157 | A | * | 8/1987 | Tenthoff ............ 210/787 |
| 4,755,165 | A | * | 7/1988 | Gunnewig ............. 494/37 |
| 5,009,794 | A | * | 4/1991 | Wynn ................ 210/739 |
| 5,104,371 | A | * | 4/1992 | Ajnefors ............. 494/27 |
| 5,137,738 | A | * | 8/1992 | Wynn ................ 426/231 |

(Continued)

FOREIGN PATENT DOCUMENTS

DE        3814761 A * 11/1988

(Continued)

*Primary Examiner*—Charles E Cooley
(74) *Attorney, Agent, or Firm*—Barnes & Thornburg LLP

(57) ABSTRACT

A method of operating a separator to disinfect raw milk or whey by operating the separator within a range of an optimal clarifying effect by recirculating a portion of a disinfected milk phase with an entraining liquid.

3 Claims, 2 Drawing Sheets

U.S. PATENT DOCUMENTS

| | | | |
|---|---|---|---|
| 5,260,079 A * | 11/1993 | Zettier et al. | 426/231 |
| 5,591,469 A * | 1/1997 | Zettier | 426/231 |
| 5,928,702 A * | 7/1999 | Lidman et al. | 426/580 |
| 6,468,574 B1 * | 10/2002 | Zettier | 426/491 |
| 7,131,370 B2 * | 11/2006 | Schauz et al. | 99/511 |
| 7,217,234 B2 * | 5/2007 | Zettier | 494/1 |
| 2004/0187711 A1 * | 9/2004 | Zettier | 99/511 |
| 2007/0082802 A1 * | 4/2007 | Klapper et al. | 494/2 |
| 2008/0017595 A1 * | 1/2008 | Zettier et al. | 210/805 |
| 2008/0279999 A1 * | 11/2008 | Duchesne et al. | 426/491 |

FOREIGN PATENT DOCUMENTS

| | | |
|---|---|---|
| DE | 38 26 461 C1 | 2/1990 |
| DE | 198 20 870 A1 | 11/1999 |
| DE | 198 07 294 C1 | 8/2001 |
| DE | 100 36 085 C1 | 1/2002 |
| JP | 02224624 A * | 9/1990 |
| WO | WO 9000862 A1 * | 2/1990 |
| WO | WO 03007700 A1 * | 1/2003 |
| WO | 2006/007894 A1 * | 1/2006 |

* cited by examiner

METHOD OF OPERATING A SEPARATOR BY RECIRCULATING AN ENTRAINING LIQUID

BACKGROUND AND SUMMARY

The present disclosure relates to a separator for disinfecting raw milk or whey. The separator includes a rotatable drum having a vertical axis of rotation, a disk stack, at least two outlets and an inlet. The present disclosure also relates to a method of operating such a separator.

In many food processing businesses, separators are used for numerous different applications and capacity spectrums. The separators generally have to be adapted to these applications and capacity spectrums with respect to their construction and design. Although they can therefore be used within a predefined work area or process, they react sensitively or often with disturbances to deviations from the defined scope and thus to capacity changes or changes of the composition of the products to be processed.

In the area of the disinfecting separators, milk is clarified from spores and/or germs. Within the past few years, the rated capacity of the used disinfecting separators has continuously increased. Separators of many different capacities of, for example, 500 l/h to 50,000 l/h are currently available on the market. For larger machines, the disk diameter currently reaches up to 500 mm.

For a good disinfecting efficiency, it is important that a sufficiently large liquid flow transports bacteria into a centrifugal field. In order to ensure this, a recirculation of an entraining liquid is known from the state of the art. In this case, the entraining liquid is diverted at a point with sufficient centrifugal force and is then removed by way of a separating disk. As a rule, this entraining liquid, which is recirculated into the inlet of the separator, bacteriologically corresponds approximately to the raw milk and is guided back directly into the inlet of the separator. Relative to the inflow quantity, the returned quantity amounts to approximately 3-5%. The amount of entraining liquid can be controlled and should not have more than twice the amount of germs of the raw milk. In contrast, by way of a solids discharge, the actual concentrate of spores and bacteria is discharged.

Such a method, as suggested above, has been successful. However, it is problematic that, despite the recirculation, particularly in the case of machines of a greater rated capacity, there is the effect that a particularly clear reduction, such as a reduction by half of the inflow capacity to half the rated capacity can impair the result of the disinfection. This effect, which does not occur in the case of smaller machines or occurs only to an extent which is not disturbing, has the result that, although the larger machines can be used well in the range of their rated capacity, they can only be used to a more restricted extent in clearly lower capacity ranges.

In contrast to the above-described state of the art, the present disclosure relates to increasing the clarifying effect of clarifying separators when disinfecting raw milk or whey.

Thus, the present disclosure relates to a separator for disinfecting raw milk or whey. The separator includes a rotatable drum having a vertical axis of rotation. The separator also includes a disk stack, at least two outlets and an inlet. Further included are a first and a second recirculation circuit located between the at least two outlets and the inlet. The present disclosure also relates to a method of operating a separator to disinfect raw milk or whey. The separator includes a rotatable drum having a vertical axis of rotation and further includes a disk stack, at least two outlets, an inlet, and a controlling device located between the at least two outlets and the inlet. The method steps include: providing a product to be processed to the separator; operating the separator; regulating the product quantity processed by controlling an amount of a recirculated product phase into the inlet such that the separator operates independently of variations of an inflow of the product quantity to be processed; and, further operating the separator within a range of an optional clarifying effect by recirculating a portion of a disinfected milk phase with an entraining liquid to the inlet.

As noted above, the present disclosure provides a separator having two recirculation circuits between the two outlets and the inlet of the separator drum.

One of the recirculation circuits is designed for the recirculation of an entraining liquid during the disinfecting of milk. That recirculation circuit has a recirculation pipe extending from the outlet of the centrifuge for entraining liquid to the inlet of the centrifuge. The other recirculation circuit is designed for the recirculation of a portion of the disinfected milk phase during the disinfecting of milk and has another recirculation pipe from the outlet of the centrifuge for disinfected milk to the inlet of the centrifuge. A valve is integrated in the recirculation circuits and pipes, which can be controlled and/or regulated.

According to an embodiment of the present disclosure, a controlling or regulating device is also provided for keeping the product quantity processed by the separator constant by regulating the recirculation circuits.

It is within the scope of the present disclosure to supplement the advantageous recirculation circuit for entraining liquid, which is known, by another recirculation pipe or recirculation circuit for clarified or disinfected milk or whey, by which the clarified milk or whey is guided back into the inlet. The additional recirculation circuit has, for example, the following advantage. When the throughput capacity becomes lower, the disinfecting effect is stabilized or even improved at a high level as a result of the separator and method of the present disclosure. When the capacity is reduced, for example, to half, this could theoretically be even by a "double disinfection", because the flow through the drum takes twice as long as in the case of the "single disinfection".

In practice, an improvement of the disinfection according to the known art, can take place only if the construction of the drum, i.e., the parts through which the flow passes, is also adapted to the reduced capacity. That is because the product may otherwise be damaged, the milk may be degassed in the inlet area, and a resulting partial blocking of the milk flow may take place. In order to avoid these problems, it would therefore be necessary to adapt the discharge, the grippers, the distributors, the inlet and outlet area, the concentrate output, etc. of the separator to the changed capacity. All these disadvantages are avoided in a simple manner by the second recirculation pipe.

Thus, by the second recirculation pipe, in the case of a disinfecting separator, the inflow capacity can be reduced. Or, under certain circumstances, in the case of smaller machines, a type of "double disinfection" can be carried out, in which case, for keeping the inflow volume of whey stable, the second recirculation pipe can be activated. Here, the pipe is selected such that a reduction of the inflow quantity is compensated by the recirculation. This ensures that the pressure range which was set is not left. The grippers or centripetal pumps always deliver in the optimal range. As a result of the same inflow conditions by the double flowing of the liquid through the drum, a stabile and improved disinfection of below 50 spores per liter is achieved also at low capacities.

In addition, the present disclosure relates to a method of operating a clarifying separator. By a controlling or regulating device, a regulating of the product quantity processed by the separator takes place. This is done by a controlling or regulating of the quantity of recirculated product phase into the inlet of the separator drum such that the separator operates independently of variations of the inflow quantity of milk product under hydraulically constant conditions, that is, the same flow conditions exist in the drum. The separator is operated within the range of an optimal clarifying effect by a recirculation of clarified milk diverted from the separator drum, with an optional return of an entraining liquid.

The following references relate to different methods of processing milk products but do not relate to the solution of the initially mentioned problems occurring during the disinfection by separators.

From German Patent Document DE 100 36 085, it is known to separate the raw whey into the cream, skimmed whey (skimmed milk) and solids (sludge with germs) constituents by a clarifying separator. When disinfecting whey, the centrifugal separation in the separator takes place such that the fat content in the cream amounts to more than 45%. Subsequently, the skimmed milk is disinfected and is then returned into the cream which was subjected to no further disinfection. The cream/skimmed milk mixture created by returning the skimmed milk into the cream is pasteurized. As a result of this method, a high pasteurization of up to 135° C. will not be necessary.

From German Patent Document DE 198 07 294, a skimming station with a clarifying separator and a skimming separator connected on the output side of the clarifying separator is known. A recirculation pipe for skimmed milk leads from the outlet of the skimming separator to the inlet of the clarifying separator, i.e., a bypass pipe, in order to minimize the loss of fat and to improve the quality of the obtained cheese powder.

German Patent Document DE 198 20 870 suggests that, during the skimming of whey by a separator, a partial quantity of from 0.5% to 2% of the outflowing whey cream, thus of the fraction containing more fat, be returned into the raw whey fed to the separator in order to improve the product quality.

Other aspects of the present disclosure will become apparent from the following descriptions when considered in conjunction with the accompanying drawings.

DETAILED DESCRIPTION

Figure 1:
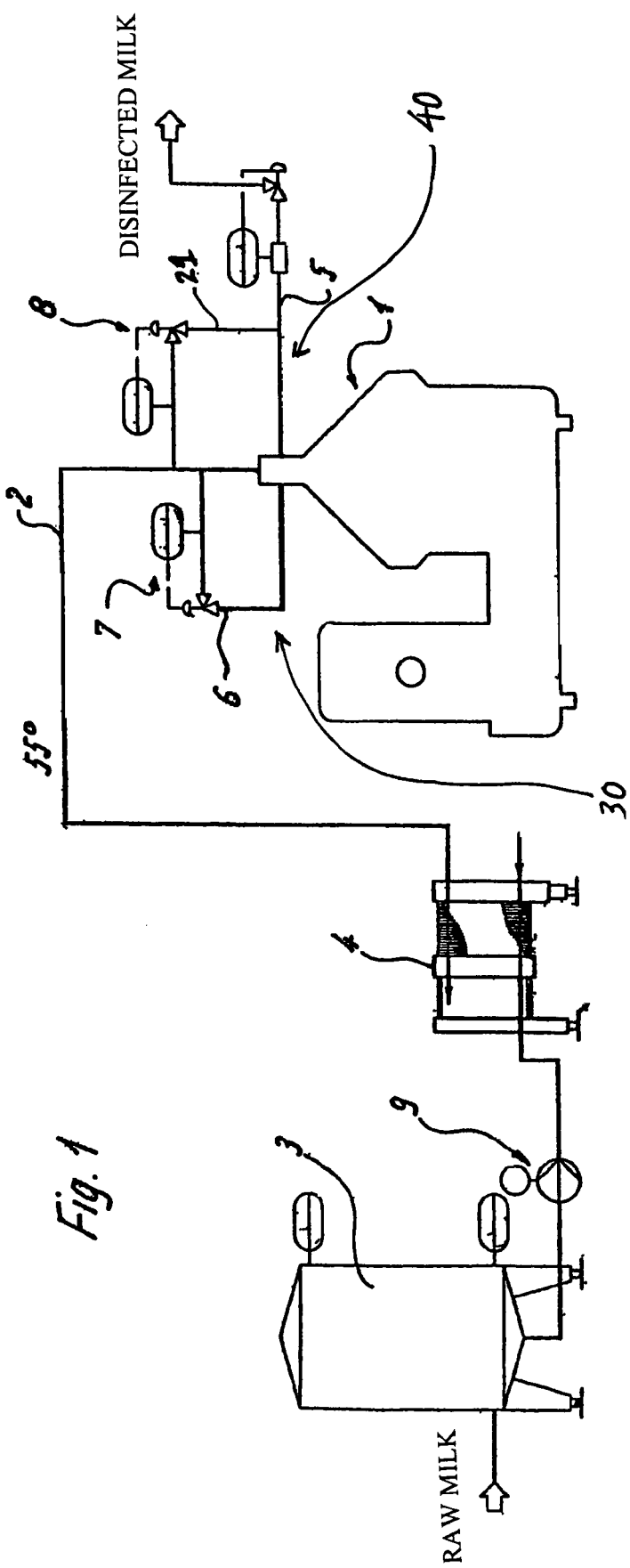
FIG. 1 is a schematic view of a system for disinfecting milk, according to the present disclosure.

FIG. 1 shows a separator 1 to which a starting product, for example, raw milk, is fed into the separator 1. The product is fed via a feed pipe 2 directly or via a valve 9, a tank 3 and/or a heat exchanger 4. The heat exchanger 4 is used for increasing or maintaining a desired temperature. A flow of liquid to and through the heat exchanger 4 is indicated by arrows. The raw milk is heated at the heat exchanger 4, for example, to a temperature of 55° C.

The separator 1 shown in FIG. 1 is used as a disinfecting separator. Such a separator 1 includes a vertical axis of rotation, as suggested in FIG. 2.

The raw milk is fed through the feed pipe 2 of FIG. 1, which leads into a feed pipe 10 (see FIG. 2) that leads into a drum 12. The feed pipe 10 is connected on an output side with a distributor 11, through which the raw milk is guided into a centrifugal space in the drum 12 having a separating disk stack insert 13.

By the disinfecting separator 1, the raw milk is clarified from germs and/or other impurities which, via solids discharge openings 14, are discharged from the drum 12 of the separator 1. That is done, for example, by a piston slide closing mechanism 15.

In contrast, the disinfected milk is removed from the disinfecting separator 1, for example, by a first gripper or centripetal pump 16 and a first outlet 17 connected to an output side. A first outlet pipe 5, in turn, is connected, to the output side of the first outlet 17.

To optimize the disinfecting process and to prevent a back-mixing between the germs and the disinfected milk in the drum 12, another liquid fraction, called an entraining liquid, is diverted, for example, by a separating disk 18 and a second gripper or second centripetal pump 19. Centripetal pump 19 has an outlet pipe 6 from the drum 12 of the separator 1. This liquid fraction may still have a relatively large fraction of germs and/or other impurities. In order to nevertheless keep product loss as low as possible, the outlet pipe 6 is designed as a recirculation pipe, which leads into the inlet 2 of the separator drum 12.

In addition, the first outlet pipe 5 for the disinfected milk also has a branch pipe 21 which is designed as another recirculation pipe and leads into the product inlet 2 of the separator 1. In this manner, as a result of the recirculation of the disinfected milk, the inflow capacity can be adjusted simply during fluctuations of the inflow quantity or in the case of a very low inflow quantity, to a value at which the disinfecting effect of the separator 1 is optimal.

Controllable valves 7, 8 are integrated in the recirculation pipes in order to control or regulate the respective quantity of recirculated entraining liquid and/or recirculated disinfected milk. Controllable valve 7 and outlet pipe 6 comprise a first recirculation circuit 30. Controllable valve 8, outlet pipe 5 and branch pipe 21 comprise a second recirculation circuit 40.

The raw milk to be processed has, for example, approximately 4.5% milk sugar, 3.5% fat and 3.5% protein. In contrast, in comparison to the raw milk to be processed, the entraining liquid, as a rule, has a clearly reduced fat content and an increased protein content.

Figure 2:
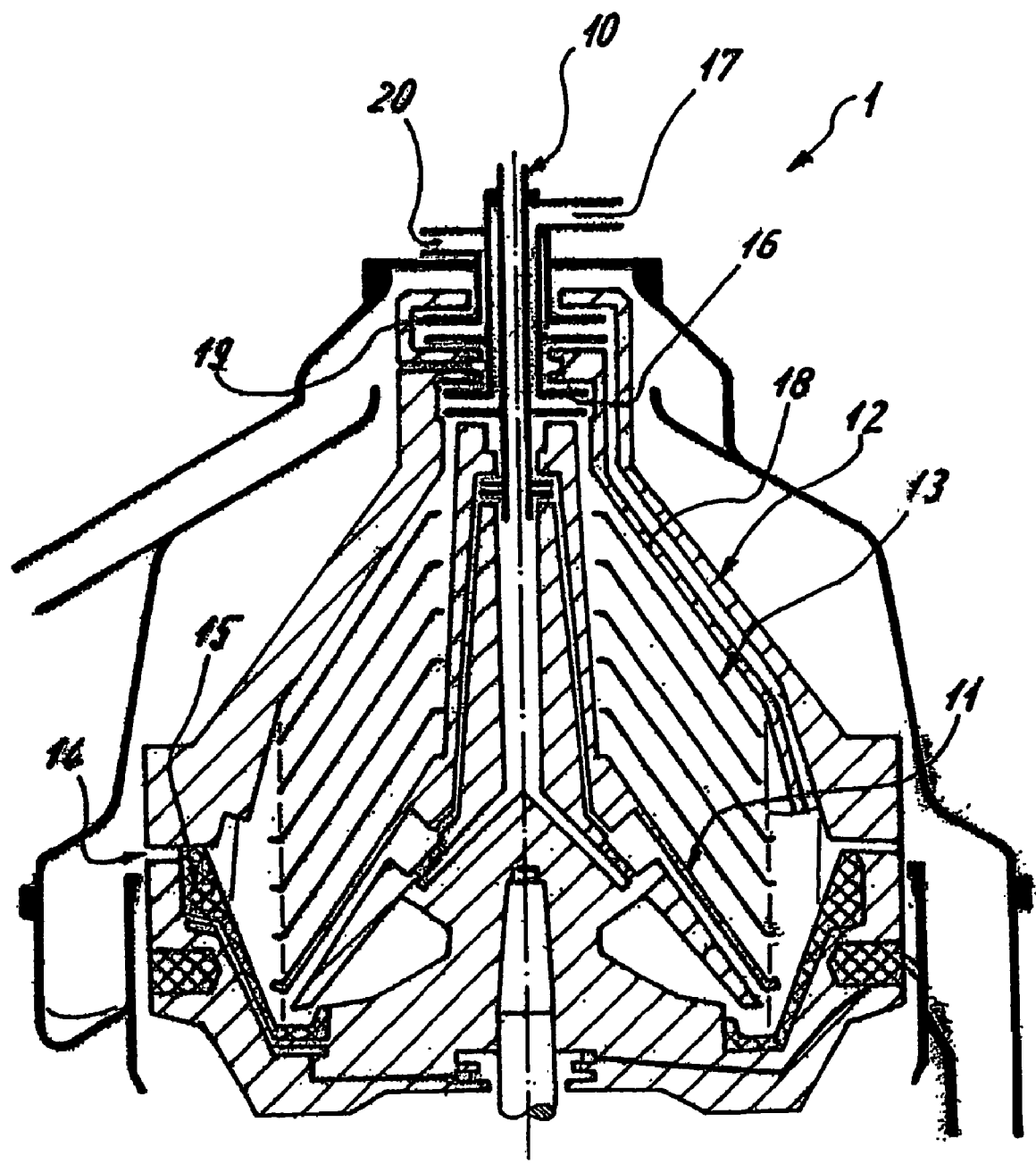
FIG. 2 is a partial cross-section view of a separator according to the present disclosure.

The present disclosure, as suggested in FIGS. 1 and 2, includes a method of operating a separator to disinfect raw milk or whey. The separator includes a rotatable drum having a vertical axis of rotation and further includes a disk stack, at least two outlets, an inlet, and a controlling device located between the at least two outlets and the inlet. The method steps include: providing a product to be processed to the separator; operating the separator; regulating a quantity of the product processed by controlling an amount of a recirculated product phase into the inlet such that the separator operates independently of variations of an inflow of the product quantity to be processed; and further operating the separator within a range of an optimal clarifying effect by recirculating a portion of a disinfected milk phase with an entraining liquid to the inlet.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A method of operating a separator to disinfect raw milk or whey, the separator including a rotatable drum having a vertical axis of rotation and further including a disk stack, at least two outlets, an inlet, and a controlling device located between the at least two outlets and the inlet, the method steps comprising:
- providing a product to be processed to the separator;
- operating the separator;
- regulating a quantity of the product processed by controlling an amount of a recirculated product phase into the inlet such that the separator operates independently of variations of an inflow of the product quantity to be processed; and
- further operating the separator within a range of an optimal clarifying effect by recirculating a portion of a disinfected milk phase with an entraining liquid to the inlet.

2. The method of claim 1, wherein the entraining liquid is a product generated within the separator.

3. The method of claim 1, wherein the entraining liquid is not a final product discharged from the separator.

* * * * *